United States Patent
Luo et al.

(10) Patent No.: US 9,591,119 B2
(45) Date of Patent: Mar. 7, 2017

(54) COMBINED TYPE ACCESSORY SYSTEM AND COMBINED TYPE ACCESSORY THEREOF

(71) Applicant: JRD COMMUNICATION INC., Shenzhen (CN)

(72) Inventors: Minli Luo, Shenzhen (CN); Li Sun, Shenzhen (CN)

(73) Assignee: JRD COMMUNICATION INC., Shenzhen (CN)

( * ) Notice: Subject to any disclaimer, the term of this patent is extended or adjusted under 35 U.S.C. 154(b) by 0 days.

(21) Appl. No.: 14/899,652

(22) PCT Filed: Apr. 2, 2015

(86) PCT No.: PCT/CN2015/075770
§ 371 (c)(1),
(2) Date: Dec. 18, 2015

(87) PCT Pub. No.: WO2016/090772
PCT Pub. Date: Jun. 16, 2016

(65) Prior Publication Data
US 2016/0323432 A1 Nov. 3, 2016

(30) Foreign Application Priority Data
Dec. 11, 2014 (CN) .......................... 2014 1 0767237

(51) Int. Cl.
*H03K 17/00* (2006.01)
*H04M 1/725* (2006.01)
*H04W 4/00* (2009.01)

(52) U.S. Cl.
CPC ......... *H04M 1/7253* (2013.01); *H04W 4/008* (2013.01); *H04M 2250/02* (2013.01); *H04M 2250/06* (2013.01)

(58) Field of Classification Search
USPC ....... 455/41.2, 559; 320/107, 108, 138, 112, 320/114
See application file for complete search history.

(56) References Cited

U.S. PATENT DOCUMENTS

2007/0072474 A1* 3/2007 Beasley ................ H02J 7/0042
439/332
2011/0043163 A1* 2/2011 Baarman ................ H02J 5/005
320/108

(Continued)

FOREIGN PATENT DOCUMENTS

| CN | 1960529 A | 5/2007 |
| CN | 203465824 U | 3/2014 |
| CN | 203761448 U | 8/2014 |

*Primary Examiner* — Ganiyu A Hanidu
(74) *Attorney, Agent, or Firm* — Shimokaji IP

(57) ABSTRACT

A combined type accessory for communications connection with a mobile terminal may include a power supply module, a control module and a function module. The control module and the power supply module can be detachably connected. The function module and the control module can be detachably connected. The power supply module can supply power to the control module and the function module, and the mobile terminal can be in communications connection with the control module so as to control the function module. Embodiments of the present invention further provide a combined type accessory system. The combined type accessory system and the combined type accessory can form various accessories through a variety of combinations, provide abundant applications of the mobile terminal, and result in convenience for people's life.

16 Claims, 2 Drawing Sheets

(56) References Cited

U.S. PATENT DOCUMENTS

2014/0067137 A1\* 3/2014 Amelio .................. H03K 17/00
                                                                                          700/286
2015/0015499 A1\* 1/2015 Park ........................ G06F 3/041
                                                                                          345/173

\* cited by examiner

COMBINED TYPE ACCESSORY SYSTEM AND COMBINED TYPE ACCESSORY THEREOF

TECHNICAL FIELD

The present disclosure relates to the field of mobile communications technologies, and in particular relates to a combined type accessory system and a combined type accessory thereof.

BACKGROUND

Along with the progress and development of communication technologies, smartphones are widely used, and people desire more and more products capable of working with smartphones, enhancing the quality of life, leading to more comfort and convenience.

According to the related art, products capable of pairing with mobile terminals, such as smartphones, can only provide one single function, and products with different functions cannot be combined in use.

SUMMARY

At least one exemplary embodiment is directed to a combined type accessory system and a combined type accessory, which can solve the problem that products paired with mobile terminals have fixed structures and provide single functions.

One technical solution according to at least one exemplary embodiment includes a combined type accessory for communication connection with a mobile terminal. The combined type accessory comprises a power supply module, a control module and a function module. The control module and the power supply module can be detachably connected. The function module and the control module can be detachably connected, and the power supply module can supply power to the control module and the function module. The mobile terminal can be in communication connection with the control module so as to control the function module, where the detachable connection between the power supply module and the control module can be achieved through engagement with a first connector group, and the detachable connection between the control module and the function module can be achieved through engagement with a second connector group. The control module comprises a processing unit and a wireless unit, the wireless unit is configured to receive signals, and the processing unit is configured to control the function module according to the signals.

Optionally, the power supply module can be provided with two prongs or three prongs for connection with a standard outlet.

Optionally, the power supply module can be further provided with a power supply processing module for converting the voltage obtained from the standard outlet to a voltage adapted to the control module and the function module.

Optionally, the first connector group comprises prongs and jacks, the jacks can be formed on the power supply module, and the prongs can be disposed on the control module. The second connector group comprises USB male ends and USB female ends, the USB female ends can be disposed on the control module, and the USB male ends can be disposed on the function module.

Optionally, the first connector group comprises USB male ends and USB female ends, the USB female ends can be disposed on the power supply module, and the USB male ends can be disposed on the control module. The second connector group comprises prongs and jacks, where the jacks can be formed on the control module, and the prongs can be disposed on the function module. Optionally, the wireless unit is Bluetooth or Wi-Fi enabled.

Another technical solution according to at least one exemplary embodiment includes a combined type accessory for communication connection with a mobile terminal, the combined type accessory comprising a power supply module, a control module and a function module. The control module and the power supply module can be detachably connected. The function module and the control module can be detachably connected. The power supply module supplies power to the control module and the function module, where a mobile terminal can be in communication connection with the control module so as to control the function module.

Optionally, the detachable connection between the power supply module and the control module can be achieved through engagement with a first connector group, and the detachable connection between the control module and the function module can be achieved through engagement with a second connector group.

Optionally, the power supply module can be provided with two prongs or three prongs for connection with a standard outlet.

Optionally, the power supply module can be further provided with a power supply processing module for converting the voltage obtained from the standard outlet to a voltage adapted to the control module and the function module.

Optionally, the first connector group comprises prongs and jacks, the jacks can be formed on the power supply module, and the prongs can be disposed on the control module. The second connector group comprises USB male ends and USB female ends, the USB female ends can be disposed on the control module, and the USB male ends can be disposed on the function module.

Optionally, the first connector group comprises USB male ends and USB female ends, the USB female ends can be disposed on the power supply module, and the USB male ends can be disposed on the control module. The second connector group comprises prongs and jacks, the jacks can be formed on the control module, and the prongs can be disposed on the function module.

Optionally, the control module comprises a processing unit and a wireless unit, the wireless unit can be configured to receive signals, and the processing unit can be configured to control the function module according to the signals. Optionally, the wireless unit can be Bluetooth or Wi-Fi.

Yet another technical solution according to at least one exemplary embodiment includes a combined type accessory system comprising any one of the above combined type accessories and mobile terminals. Optionally, the mobile terminal can be a cell phone with functions of wireless communication.

In a combined type accessory system of embodiments, the accessory can be modularized, and a detachable connection can be achieved between the power supply module, the control module and the function module, where different functions can be implemented just by working with different function modules. Relative to the fixed structure of accessories according to the related art, embodiments herein of the combined type accessory system and the combined type accessory can form various accessories through a variety of combinations, provide abundant applications of the mobile terminal, and result in convenience for people's lives.

DETAILED DESCRIPTION

Technical solutions in the exemplary embodiments will be clearly and completely described below with reference to the drawings of the exemplary embodiments of the present invention. As is apparent, the exemplary embodiments to be described are only a part, rather than the whole, of the embodiments of the present invention. Other exemplary embodiments can be obtained by those skilled in the art on the basis of the exemplary embodiments of the present invention and without making any inventive effort can be encompassed by the present invention.

Figure 1:
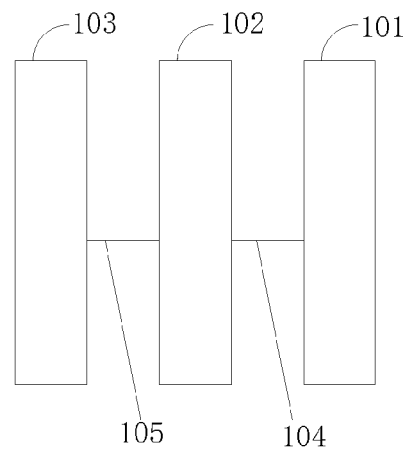
FIG. 1 illustrates the structure of one embodiment of the combined type accessory according to at least one exemplary embodiment.

FIG. 1 illustrates the structure of one embodiment of the combined type accessory according to at least one exemplary embodiment. The combined type accessory in the embodiment of the present invention is provided for communication connection with a mobile terminal, and specifically, the combined type accessory in an embodiment of the present invention can include a power supply module 101, a control module 102 and a function module 103.

The power supply module 101 may supply power to the control module 102 and the function module 103. The power supply module 101 can be provided with two prongs or three prongs for connection with a standard outlet, for example, 220 v AC which can be obtained through connection with a standard outlet. The power supply module 101 can be further provided with a power supply processing module for converting the voltage obtained from the standard outlet to a voltage adapted to the control module 102 and the function module 103. In at least one embodiment, the power supply processing module may be a power supply transformer, and the power supply transformer may convert 220 v AC to a voltage adapted to the control module 102 and the function module 103, e.g. 5 v DC.

The control module 102 and the power supply module 101 can be detachably connected, and specifically, the detachable connection between the power supply module 101 and the control module 102 can be achieved through engagement with a first connector group 104. In at least one embodiment, the first connector group 104 comprises prongs and jacks, the jacks can be formed on the power supply module 101, and the prongs can be disposed on the control module 102. Through the engagement between the jacks and the prongs, electric connection can be realized contemporaneously when the detachable connection between the control module 102 and the power supply module 101 is achieved. In other exemplary embodiments, the first connector group 104 may also comprise USB male ends and USB female ends, the USB female ends can be disposed on the power supply module 101, and the USB male ends can be disposed on the control module 102. Through the engagement between the USB female ends and the USB male ends, electric connection can be realized contemporaneously when the detachable connection between the control module 102 and the power supply module 101 is achieved. However, the present invention does not make limitations thereto, and those skilled in the art may connect the control module 102 with the power supply module 101 in other detachable manners according to actual needs. The control module 102 may comprise a processing unit and a wireless unit, the wireless unit is configured to receive signals, and the processing unit is configured to control the function module 103 according to the signals. In at least one embodiment, the wireless unit can be Bluetooth or Wi-Fi. In other exemplary embodiments, the wireless unit may also include other devices capable of communication connection with the mobile terminal, to which the present invention is not limited.

The function module 103 and the control module 102 can be detachably connected, and specifically, the detachable connection between the control module 102 and the function module 103 can be achieved through engagement with a second connector group 105. In at least one embodiment, the second connector group 105 comprises USB male ends and USB female ends, the USB female ends can be disposed on the control module 102, and the USB male ends can be disposed on the function module 103, and through the engagement between the USB female ends and the USB male ends, electric connection may be realized contemporaneously when the detachable connection between the function module 103 and the control module 102 is achieved. In other exemplary embodiments, the second connector group 105 may also comprise prongs and jacks, the jacks can be formed on the control module 102, the prongs can be disposed on the function module 103. Through the engagement between the prongs and the jacks, electric connection may be realized contemporaneously when the detachable connection between the function module 103 and the control module 102 is achieved. However, the present invention is not limited thereto, and those skilled in the art may connect the function module 103 with the control module 102 in other detachable manners according to actual needs. The function module 103 may be a device to achieve a specific function, e.g. an outlet, a LED lamp, or an audio device.

It should be noted that, in the above structure capable of detachable connection, USB female ends or jacks may be disposed only on the power supply module 101, the control module 102 and the function module 103, and the connection therebetween may be achieved with cables having USB male ends or prongs.

The components and connection relations of the combined type accessory are described above, and the operating process of the combined type accessory will be described below with reference to specific but non-limiting embodiments.

In an exemplary embodiment, the function module 103 comprises an outlet and a switch, and the control module 102 comprises Wi-Fi. The power supply module 101 can be connected to a regular outlet through three prongs, the function module 103 and the control module 102; and the power supply module 101 and the control module 102 can be connected in the detachable manner as described above. An intelligent outlet may be formed through this combination, and a mobile terminal may remotely control the switch of an appliance through the intelligent outlet. For example, the intelligent outlet can be inserted between a regular outlet and an air conditioner, and before a user comes back home, the control module can be controlled via Wi-Fi communication using a mobile terminal, such as a cell phone, at an APP end, thereby turning on the switch and activating the air conditioner. When the user gets home, the room may have already reached a set appropriate temperature.

In an exemplary embodiment, the function module 103 comprises a bulb and a switch, and the control module 102 comprises Wi-Fi. The power supply module 101 can be connected to a regular outlet through three prongs, the function module 103 and the control module 102; and the power supply module 101 and the control module 102 can be connected in the detachable manner as described above. An intelligent bulb may be formed through this combination, and a mobile terminal can remotely control the switch of the intelligent bulb. For example, the power supply module 101 of the intelligent bulb can be inserted into a regular outlet, and when a user travels with no one at home, the user can remotely control the switch of the intelligent bulb at any time through an APP on the cell phone, leading to a deceptive appearance that no one is home and satisfying certain anti-theft requirements.

It should be noted that, in the above two embodiments, the control module 102 may also use Bluetooth. The control module 102 can be in communication connection with a mobile terminal through Bluetooth, to which the present invention is not limited. Provided that the power supply module 101 and the control module 102 remain unchanged, as described above, accessories with different functions may be achieved only by changing different function modules 103, which enriches applications of the mobile terminal, and results in convenience for people's lives.

Figure 2:
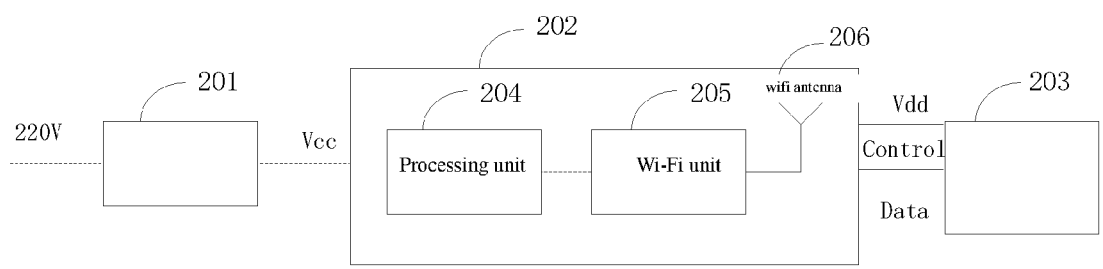
FIG. 2 illustrates the structure of an embodiment of the combined type accessory according to at least one exemplary embodiment.

FIG. 2 illustrates the structure of an example of the combined type accessory according to at least one exemplary embodiment.

In at least one embodiment, the power supply module 201 comprises a power supply transformer to convert 220 v AC to 5 v DC Vcc, and Vcc supplies power to the control module 202. The 220 V input is the input to the three-prong plug on the power supply module 201.

The control module 202 may comprise a processing unit 204, a Wi-Fi unit 205 and a Wi-Fi antenna 206. The control module 202 and the power supply module 201 may form a detachable connection via the first connector group described above, and Vcc provided by the power supply module 201 supplies power to the control module 202. The control module 202 may output a control signal (control), a data signal (Data) and a power supply (Vdd), where Vdd is typically about 3.3 V and supplies power to the function module 203. The Wi-Fi unit 205 can receive information from the Wi-Fi antenna 206, can transmit the information, after demodulation, to the processing unit 204, where the processing unit 204 performs analysis and processing, and finally, the processing unit 204 outputs the processed control information and data information to the function module 203.

The function module 203 may comprise a Speaker unit. The function module 203 and the control module 202 can form a detachable connection via the second connector group described above. The function module 203 can receive the Vdd, control and data signals from the control module 202. Vdd is the power supply to the Speaker unit. The control information can be used to control the play/stop, volume increase/decrease, of the speaker; and the Data information can be the content to be played.

With respect to the above accessory, a mobile terminal may form communication connection with the accessory via Wi-Fi and control the speaker unit to play music.

Figure 3:
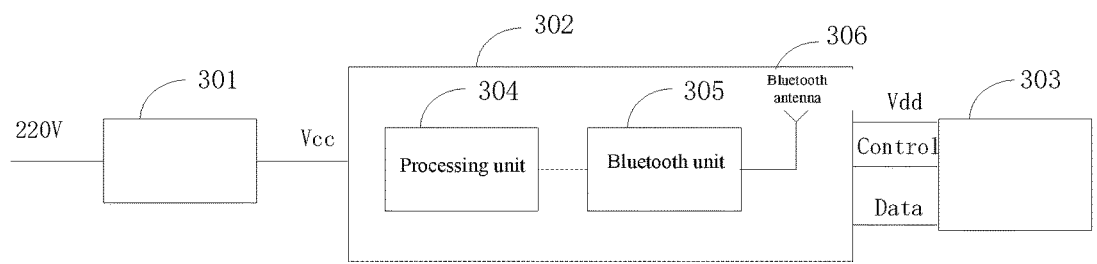
FIG. 3 illustrates the structure of an embodiment of the combined type accessory according to at least one exemplary embodiment.

FIG. 3 illustrates the structure of an embodiment of the combined type accessory according to at least one exemplary embodiment.

In at least one embodiment, the power supply module 301 can be the same as the power supply module 201 in the embodiment. The control module 302 comprises a processing unit 304, a Bluetooth BT unit 305 and a Bluetooth BT antenna 306; the control module 302 outputs a control signal (control), a data signal (Data) and a power supply (Vdd); Vdd is typically around 3.3 V as a power supply to the function module 303. The function module 303 comprises a LED lamp array unit.

With respect to the above accessory, a mobile terminal may form communication connection with the accessory via the Bluetooth BT unit and control the LED lamp array unit to perform LED variations with different colors and different brightness.

The present invention further provides a combined type accessory system. The combined type accessory system comprises any one of the above combined type accessories and mobile terminals, and the mobile terminal can be a cell phone with functions of wireless communication.

With the combined type accessory system and the combined type accessory thereof in exemplary embodiments of the present invention, the accessory can be modularized, and a detachable connection can be achieved between the power supply module, the control module and the function module. Different functions can be implemented just by working with different function modules. Relative to the fixed structure of accessories according to the related art, the combined type accessory system and the combined type accessory thereof in exemplary embodiments of the present invention can form various accessories through a variety of combinations, provide abundant applications of the mobile terminal, and result in convenience for people's lives.

Only non limiting examples of embodiments of the present invention are described above, which do not intend to limit the scope of the present invention. Any equivalent structure or equivalent procedure variation made according to the Specification and Drawings of the present invention, or direct or indirect applications in other related technical fields, shall similarly be encompassed by the present invention.

The invention claimed is:

1. A combined type accessory comprising:
a power supply module comprising prongs attachable to a standard outlet providing AC power;
a control module detachably connected to the power supply module, wherein the control module comprises a switchable high amperage power outlet;
a function module detachably connected to the control module,
wherein the power supply module supplies power to the control module and the function module; and
a mobile terminal, where the mobile terminal is in communication connection with the control module and is configured to control the function module, wherein
the detachable connection between the power supply module and the control module is achieved through engagement with a first connector group, and the detachable connection between the control module and the function module is achieved through engagement with a second connector group, wherein
the control module comprises a processing unit and a wireless unit,
wherein the wireless unit is a Wi-Fi unit configured to: receive signals from a Wi-Fi antenna and transmit the signals, after demodulation, to the processing unit; and
wherein the processing unit is configured to: perform analysis and processing of the demodulated signals and output a processed control information and data information to control the function module according to the signals, wherein the control of the function module includes switching the switchable high amperage power outlet.

2. The combined type accessory according to claim 1, wherein the function module comprises a household appliance.

3. The combined type accessory according to claim 1, wherein the power supply module further includes a power supply processing module configured to convert a voltage obtained from the standard outlet to a voltage adapted to the control module and the function module.

4. The combined type accessory according to claim 1, wherein
the first connector group comprises prongs and jacks, the jacks are formed on the power supply module, and the prongs are disposed on the control module, and wherein
the second connector group comprises USB male ends and USB female ends, the USB female ends are disposed on the control module, and the USB male ends are disposed on the function module.

5. The combined type accessory according to claim 1, wherein
the first connector group comprises USB male ends and USB female ends, the USB female ends are disposed on the power supply module, and the USB male ends are disposed on the control module, and wherein
the second connector group comprises prongs and jacks, the jacks are formed on the control module, and the prongs are disposed on the function module.

6. A combined type accessory comprising:
a power supply module comprising prongs attachable to a standard outlet providing AC power;
a control module detachably connected to the power supply module, wherein the control module comprises a switchable power outlet, and where the control module is configured to communicate with a mobile terminal;
wherein the control module comprises a processing unit and a wireless unit,
wherein the wireless unit is a Wi-Fi unit configured to: receive signals from a Wi-Fi antenna and transmit the signals, after demodulation, to the processing unit; and wherein the processing unit is configured to: perform analysis and processing of the demodulated signals and output a processed control information and data information to control the function module according to the signals, wherein the control of the function module includes switching the switchable high amperage power outlet; and
a function module detachably connected to the control module, where the control module is configured to control the function module by switching the switchable power outlet, and
wherein the power supply module supplies power to the control module and the function module.

7. The combined type accessory according to claim 6, wherein the detachable connection between the power supply module and the control module is achieved through engagement with a first connector group, and the detachable connection between the control module and the function module is achieved through engagement with a second connector group.

8. The combined type accessory according to claim 7, wherein the function module comprises a high amperage household appliance.

9. The combined type accessory according to claim 8, wherein the power supply module further includes a power supply processing module configured to convert the voltage obtained from the standard outlet to a voltage adapted to the control module and the function module.

10. The combined type accessory according to claim 7, wherein
the first connector group comprises prongs and jacks, the jacks are formed on the power supply module, and the prongs are disposed on the control module, wherein
the second connector group comprises USB male ends and USB female ends, the USB female ends are disposed on the control module, and the USB male ends are disposed on the function module.

11. The combined type accessory according to claim 7, wherein
the power supply module is provided with two prongs or three prongs for connection with a standard outlet.

12. A combined type accessory system, comprising:
a mobile terminal; and
a combined type accessory comprising:
a power supply module comprising prongs attachable to a standard outlet providing AC power;
a control module detachably connected to the power supply module, wherein the control module comprises a switchable power outlet, and where the control module is configured to communicate with the mobile terminal;
wherein the control module comprises a processing unit and a wireless unit, wherein the wireless unit is a Wi-Fi unit configured to: receive signals from a Wi-Fi antenna and transmit the signals, after demodulation, to the processing unit; and wherein the processing unit is configured to: perform analysis and processing of the demodulated signals and output a processed control information and data information to control the function module according to the signals, wherein the control of the function module includes switching the switchable high amperage power outlet;
a function module detachably connected to the control module, where the control module is configured to control the function module by switching the switchable power outlet, and
wherein the power supply module supplies power to the control module and the function module.

13. The system according to claim 12, wherein the mobile terminal is a cell phone with functions of wireless communications.

14. The combined type accessory according to claim 11, wherein the first connector group comprises USB male ends and USB female ends, the USB female ends are disposed on the power supply module, and the USB male ends are disposed on the control module.

15. The combined type accessory according to claim 14, wherein the second connector group comprises prongs and jacks, the jacks are formed on the control module, and the prongs are disposed on the function module.

16. The combined type accessory according to claim 15, wherein the control module comprises a processing unit and a wireless unit, the wireless unit is configured to receive signals, and the processing unit is configured to control the function module according to the signals.

* * * * *